United States Patent
Curlier et al.

(10) Patent No.: US 10,168,236 B2
(45) Date of Patent: Jan. 1, 2019

(54) TORQUE-MEASUREMENT DEVICE FOR A TURBOMACHINE SHAFT

(71) Applicant: SNECMA, Paris (FR)

(72) Inventors: Augustin Curlier, Boissise la Bertrand (FR); Gilles La Gouellec, Paris (FR); Alexis Kunakovitch, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 258 days.

(21) Appl. No.: 15/100,838

(22) PCT Filed: Dec. 2, 2014

(86) PCT No.: PCT/FR2014/053138
§ 371 (c)(1),
(2) Date: Jun. 1, 2016

(87) PCT Pub. No.: WO2015/082835
PCT Pub. Date: Jun. 11, 2015

(65) Prior Publication Data
US 2016/0299019 A1    Oct. 13, 2016

(30) Foreign Application Priority Data

Dec. 3, 2013   (FR) ..................................... 13 62037
Feb. 10, 2014  (FR) ..................................... 12 51011

(51) Int. Cl.
*G01L 3/10*      (2006.01)
*G01L 25/00*     (2006.01)
*G01L 1/16*      (2006.01)

(52) U.S. Cl.
CPC .............. *G01L 3/104* (2013.01); *G01L 1/165* (2013.01); *G01L 3/102* (2013.01); *G01L 25/003* (2013.01)

(58) Field of Classification Search
CPC ......... G01L 1/165; G01L 3/102; G01L 3/104; G01L 25/003
(Continued)

(56) References Cited

U.S. PATENT DOCUMENTS 2,521,905 A * 9/1950 Felier ...................... G01L 3/102
                                                    73/862.28
3,939,448 A * 2/1976 Garshelis ................ H01F 7/021
                                                     335/215

(Continued)

FOREIGN PATENT DOCUMENTS

WO    WO-9626420    8/1996

OTHER PUBLICATIONS

Sachs, Thomas, et al., "Remote sensing using quartz sensors", *Proceedings of SPIE, S P I E—International Society for Optical Engineering*, vol. 2718, (May 30, 1996), 47-58.

*Primary Examiner* — Max Noori
(74) *Attorney, Agent, or Firm* — Womble Bond Dickinson (US) LLP

(57) ABSTRACT

The present invention relates to a torque-measurement device for a turbine engine shaft (1) including a proof body (7) capable of being mounted on the shaft, characterized in that the proof body (7) forms a mounting for at least one acoustic-wave strain gauge (20) and is magnetized such as to allow the torque to be measured by magnetostrictive effect. The invention also relates to a method for calibrating the torque-measurement system including a first step of calibrating said device, the device being mounted on a shaft but outside of the engine, by applying reference torques to the shaft with the device and by establishing a rule regarding the relationship between the strain measured by said strain gauge and the actual torque applied, a step of mounting the shaft with the device inside the turbine engine together with placement of the magnetostrictive measurement system, the (Continued)

calibration of the first step being optionally reset with the engine stopped, and a step of establishing a calibration rule regarding the relationship between the torque measured by magnetostrictive effect and the reference torque provided by the strain gauges.

11 Claims, 2 Drawing Sheets

(58) Field of Classification Search
USPC .......................................................... 73/1.09
See application file for complete search history.

(56) References Cited

U.S. PATENT DOCUMENTS

| | | | |
|---|---|---|---|
| 4,078,186 A | 3/1978 | Folen et al. | |
| 4,523,482 A * | 6/1985 | Barkhoudarian | G01L 3/103 324/209 |
| 4,627,298 A * | 12/1986 | Sahashi | G01L 3/102 324/209 |
| 4,760,745 A * | 8/1988 | Garshelis | G01L 3/102 73/862.333 |
| 4,805,466 A * | 2/1989 | Schiessle | G01L 3/102 73/862.336 |
| 4,891,992 A * | 1/1990 | Kobayashi | G01L 3/102 73/862.335 |
| 4,896,544 A * | 1/1990 | Garshelis | G01L 3/102 73/862.333 |
| 4,899,598 A * | 2/1990 | Gumaste | G01L 3/102 73/862.335 |
| 5,351,555 A * | 10/1994 | Garshelis | G01L 3/102 336/30 |
| 5,386,733 A * | 2/1995 | Hesthamar | G01L 3/102 73/779 |
| 5,591,925 A * | 1/1997 | Garshelis | G01L 3/102 324/207.13 |
| 5,952,762 A * | 9/1999 | Larsen | B60R 16/027 310/232 |
| 6,047,605 A * | 4/2000 | Garshelis | G01L 3/102 73/862.333 |
| 6,098,468 A * | 8/2000 | Mohri | G01L 3/102 73/862.333 |
| 6,490,934 B2 * | 12/2002 | Garshelis | G01L 3/102 73/862.336 |
| 6,516,508 B1 * | 2/2003 | Gandarillas | G01L 3/102 29/602.1 |
| 6,817,253 B2 * | 11/2004 | Gandrud | G01L 3/102 73/862.23 |
| 6,925,892 B2 * | 8/2005 | Gandrud | B66D 1/40 73/862.331 |
| 7,127,797 B1 * | 10/2006 | Kilmartin | G01L 3/102 29/602.1 |
| 7,256,505 B2 * | 8/2007 | Arms | B60C 23/0411 290/1 R |
| 7,401,531 B2 * | 7/2008 | Cripe | G01L 3/102 73/862.333 |
| 7,617,741 B1 * | 11/2009 | Lowe-Wylde | F03D 7/042 73/862.29 |
| 8,844,375 B2 * | 9/2014 | Sihler | G01L 5/164 73/862.041 |
| 9,856,967 B2 * | 1/2018 | Morselli | F16H 57/01 |
| 2011/0193552 A1 * | 8/2011 | Fulkerson | G01P 3/487 324/207.25 |

* cited by examiner

TORQUE-MEASUREMENT DEVICE FOR A TURBOMACHINE SHAFT

FIELD OF THE INVENTION

The present invention relates to devices for measuring the torque transmitted by an engine shaft, for example a shaft of a turbine engine of an aircraft.

PRIOR ART

The prior art includes in particular US-A1-2007/030134.

Measuring torque on power shafts in a turbine engine is a very important parameter for regulating, protecting and designing the engine, in particular with regard to turboprop engines.

According to a known technique, the determination of the torque is based on a measurement of the torsional deformation of the shaft, because said deformation is dependent on the transmitted torque.

The present invention relates to a device which is used to measure the strain of the shaft to which it is subjected.

The torque measurements based on a deformation of the shaft are usually carried out using interleaved phonic wheels, by means of which the phase displacement is measured using a fixed probe. The phonic wheels are each rigidly connected to the shaft at points which are remote from one another, and the phase displacement between angular reference points supported by the wheels makes it possible to determine the torsional deformation of the shaft between these two points. For example, WO 2009/141261 or WO 2011/144874, in the names Turbomeca and Snecma respectively, describe methods and devices which implement such a technique.

This technique is well known, and the disadvantages thereof can be anticipated. It is thus sensitive to noise and to external disruptions, which produces average precision. It is also sensitive to the installation in the engine and to the variations in the air gap during the operation of the engine which have to be reduced.

During the design and the development of new engines, the solution based on inserting interleaved phonic wheels may prove to be inappropriate due to the variations in the air gap between the edge of the sensor and the phonic wheel which can occur in the engine. This is the case for example when said variation in the air gap has been generated by imbalances or aircraft loads.

When the studies on the engine lead to a very large estimation of the consumption of clearance, other techniques are selected instead.

The calibration of the torque measurement is another problem which may be posed. The calibration consists in establishing a law correlating the strain which is measured with respect to an applied torque.

From experience, it is necessary to carry out said calibration once the measuring system is integrated in the engine and not in the bench. In practice, edge effects are noted which are linked to the integration of the measuring system in the engine. These effects are explained by the fact that the calibration in the bench is carried out with a spatial configuration which is different from the definitive configuration once the system is mounted on the engine: the mounting tolerances and the chains of dimensions play an important role in terms of the calibration law.

The use of a brake-testing bench at the shaft output is thus the method which is currently used to calibrate the measuring system, the brake-testing bench providing a reference torque measurement. In engines comprising a plurality of propellers, the use of a brake-testing bench is however not possible, because the hubs of the propellers cannot be accessed when the engine is assembled. In such an event, the problem is posed of calibrating the measuring system with respect to an external reference.

The fact that it is impossible to use the traditional measuring method and the fact that it is impossible to calibrate the measurement have led to research into a new torque-measuring system.

The invention firstly relates to a torque-measuring system which can tolerate variations in the air gap.

It is known to measure torque using surface acoustic wave strain gauges, which are often referred to by the acronym SAW.

A SAW strain gauge comprises a piezoelectric element which is excited by an electromagnetic wave close to the resonance frequency thereof by means of an antenna. The electromagnetic wave translates into a surface acoustic wave in the material. Once excited, the material resonates and emits an echo wave. The frequency of the electromagnetic wave is read by a control unit and makes it possible to ascertain the strain applied to the gauge. A measurement method using SAW gauges is described for example in FR 2919050 in the name of the company Senseor.

The present applicant has developed a means of integrating gauges operating according to this principle in the shaft of a turbine engine. Said means is described in FR 1362037, which was filed on Feb. 12, 2013. The solution has the advantage of being able to see all the components which are necessary for the measurement directly integrated in the shaft. Said components are thus located in the definitive spatial configuration thereof before the installation thereof in the engine. A calibration which is carried out outside the engine is thus disrupted very little by the installation in the engine, by contrast with the measuring system using interleaved phonic wheels in particular. The edge effects of the integration in the engine are small. This expression denotes the precise arrangement of the different parts of the measuring system which can greatly disrupt the measuring performance.

However, this technique has the disadvantage of having a low maturity level. In the current state of the development thereof, the operating life and the robustness of the assembly are not adapted to a series aeronautical application.

Furthermore, the torque-measuring technique using a magnetostrictive effect is known.

This technique consists in magnetising two shaft portions which are polarised in opposite directions according to the circumferential direction thereof. The magnetic field which is produced is proportional to the transmitted torque and can be measured by magnetic field detectors which are arranged around the shaft. One embodiment is described for example in U.S. Pat. No. 5,052,232.

This technique has a greater maturity level than that of the SAW gauges. It is estimated that the operating life and the robustness of the means which are used are better for a series motor because the processing of the signal is simpler, since the mechanical interactions and the number of elements are limited. Furthermore, it is possible to achieve an excellent degree of precision.

However, the measuring systems using a magnetostrictive effect have, in particular with respect to the SAW gauges, the disadvantage of needing to be mounted on the engine twice because firstly the stator elements and secondly the rotor elements which make up the systems have to be mounted separately. Due to the mounting tolerances, the measuring system is thus in a different mechanical configuration on the engine than during a calibration outside the engine. The calibration of the measurement carried out by means of this technique is thus sensitive to the installation on the engine.

The present invention secondly relates to producing a device and an associated system which are both tolerant to the variations in the air gap, are robust, and of which the calibration of the measurement is compatible with the requirements related to the new engines in development.

SUMMARY OF THE INVENTION

These objects are achieved with a torque-measuring device for a turbine engine shaft comprising a test piece which can be mounted on said shaft, characterised in that the test piece forms a support for at least one acoustic wave strain gauge and is magnetised so as to allow torque to be measured by means of a magnetostrictive effect.

The device according to the invention, by combining the measuring means on the same test piece, makes it possible to calibrate the magnetostrictive measurement for the regulation of the engine by means of the measurement carried out previously using the acoustic wave strain gauge(s) as instrumentation.

A test piece is a part which can ensure the transformation of the physical quantity to be measured into another measurable physical quantity.

The device from the invention has the following advantages:

The magnetostrictive measurement can be calibrated once installed on the engine; it is thus possible to avoid calibration outside the engine, which is not very representative, and thus performance is improved.

The use of a brake-testing bench which is particularly costly or impossible to use is thus avoided.

The performance of the measuring systems is evaluated once said systems are mounted on the engine.

This makes it possible to evaluate, or even characterise, the edge effects which are related to the installation of the measurement in the engine.

According to a preferred embodiment, the test piece has a tubular shape, said gauge being fixed to the wall of the tubular element and comprises an antenna for transmitting signal which is connected to the gauge, said tubular element being arranged so as to be mounted concentrically with said shaft and having two elements for fixing to the shaft, which elements are axially remote from one another.

Advantageously, the gauge is mounted on the interior face of the tubular element. The fixing is preferably ensured by adhesion; the connection between the gauge and the support thereof is thus subjected solely to compressive forces which guarantee a better hold over time. Furthermore, this makes it possible to protect the fixing during use.

More specifically, at least one of the fixing elements is a friction fixing element and comprises in particular a contact surface which is perpendicular to the axis of the tubular element. Said fixing element has the advantage of avoiding any magnetic lag effect on the measurement because the frictional contact ensures constant holding without any operating clearance.

Also preferably, one of the fixing elements comprises teeth which are arranged so as to cooperate with the teeth on the shaft which have a complementary shape. This embodiment has the advantage of facilitating the mounting on the shaft insofar as it does not require the use of a tool which is intended to hold the tubular element in place during tightening, the aim being to avoid creating parasitic strains in the region of friction. Furthermore, it guarantees that the torsion of the structure is maintained even in the case where the shaft is elongated or shrunk because the teeth can slide into the jaw teeth in the axial direction without jeopardising the radial torsion.

The antenna is advantageously cylindrical and is for example mounted on an edge of the test piece.

The invention also relates to the turbine engine shaft, comprising a device for measuring the torsional deformation thereof according to the invention. The shaft comprises for example a radial flange, one end of the device being held on the shaft by bearing axially against the flange and optionally comprising a jaw tooth connection at the other end thereof.

The invention also relates to a torque-measuring system for a turbine engine shaft, comprising a device according to the invention, a sensor which can be fixed on a stator part opposite the test piece for magnetostrictive measurement, a fixed antenna which can receive the signals from the strain gauge and a unit for processing the signal.

The invention also relates to a method for calibrating the torque-measuring system, comprising:
a first step of calibrating said device, the device being mounted on the shaft, but outside the engine, by applying reference torques, in particular static reference torques, to the shaft with the device and establishing a law between the strain measured by said SAW strain gauge and the actual torque applied,
a step of mounting the shaft with the device in the turbine engine with the insertion of the magnetostrictive measuring system,
optionally the calibration of the first step is recalibrated when the engine is stopped, and
a step of establishing a calibration law between the torque measured using a magnetostrictive effect and the reference torque given by the SAW strain gauges.

Once the system is calibrated, the measurements are carried out solely by magnetostrictive means.

DESCRIPTION OF THE DRAWINGS

The invention will be better understood, and other details, features and advantages of the invention will become apparent upon reading the following description, given by way of non-limiting example with reference to the accompanying drawings, in which.

DETAILED DESCRIPTION OF THE INVENTION

The surface acoustic wave devices are used to produce remote interrogation systems.

They generally comprise an interrogation system comprising means for emitting/receiving radiofrequency waves which are associated with electronics for processing data and at least one surface acoustic wave gauge. See FIG. 1.

The operating principle is as follows: the interrogation system sends an interrogation signal to the SAW gauge; the SAW gauge receives the interrogation signal, convolves said signal with the impulse response thereof and re-emits an echo processed in this way to the interrogation system; the receiver of the interrogation system detects, outside the time window of emitting the interrogation signal, all or part of the echo of the gauge and the processing electronics extract information relating to the deformation of the gauge.

Figure 1:
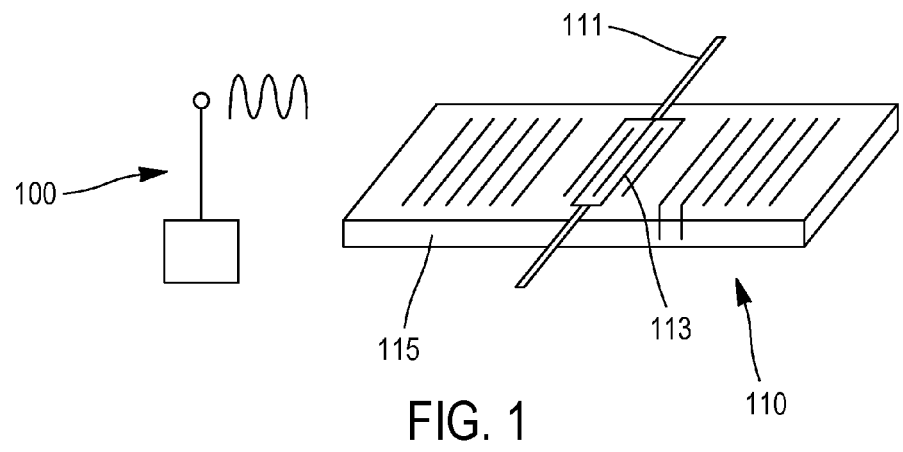
FIG. 1 is a diagram illustrating the operating principle of an acoustic wave strain gauge.

A SAW device comprises for example as indicated in FIG. 1: an interrogation system 100; at least one gauge 110 comprising an antenna 111, a transducer 113 having interdigitated comb electrodes and a delay line connected to the antenna. The interrogation system 100 sends a radiofrequency pulse having a small time width. The antenna of the gauge receives the radiofrequency signal. The transducer transforms the radiofrequency signal into an acoustic pulse. One or more acoustic reflectors reflect the pulse into a plurality of echoes. The transducer transforms said series of acoustic echoes into a radiofrequency pulse which is re-emitted by the antenna.

These devices make it possible to measure the torque transmitted by the shaft by means of the excitation of a piezoelectric element 115 which is fixed to the test piece, the resonance frequency of which depends on the strain which is applied thereto. The resonance frequency is transmitted to the fixed electronics by means of a rotating antenna.

The torque in the shaft produces a torsion in the test piece which depends on the combination of the mechanical rigidities of the shaft and of the test piece. The torsion in the test piece produces a deformation of the gauge which depends on the rigidity of the adhesive between the test piece and the gauge. The strain of the gauge is related to the deformation by means of the rigidity thereof, and it is measured by measuring the variation in the resonance frequency.

Figure 2:
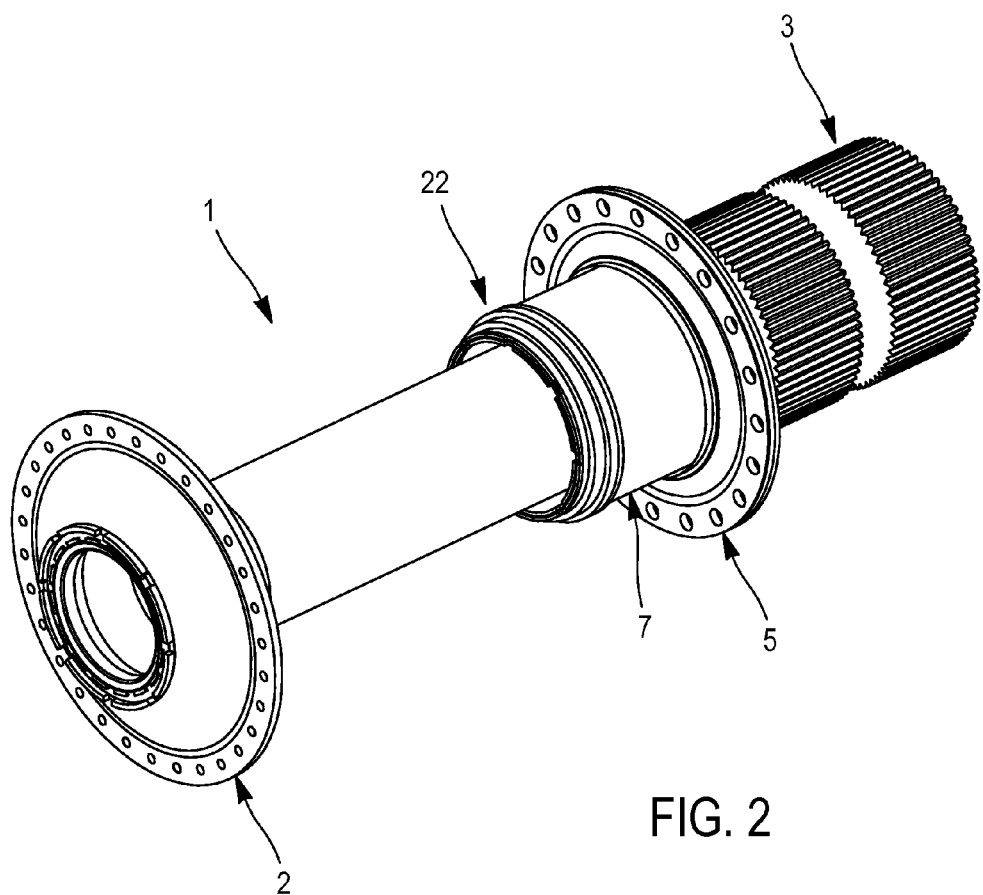
FIG. 2 is a perspective view of a turbine engine shaft equipped with a measuring device according to the invention.

FIG. 2 is a perspective view of an example of a power transmission shaft in a turbine engine. The shaft 1, in this case, comprises a flange 2 at one end and is connected at the other end thereof, by means of a flange connection 5, to a pinion 3 which facilitates connection to a member which is driven by the shaft, for example a speed reducer. In order to ascertain the torque transmitted by the shaft 1, it is known to measure the strains thereof. This measurement is carried out, within the scope of the invention, in a contactless manner by a device using the magnetostrictive effect, i.e. varying the magnetic permeability of a ferromagnetic material which is subjected in this case to the strain. The device thus comprises a magnetised test piece 7 having a tubular shape which is fixed to the shaft 1 by the two ends thereof: on one side, it bears axially against the flange 5 and, on the other side, it is held by a nut.

The torque in the shaft produces a torsion in the test piece which depends on the combination of the mechanical rigidities of the shaft and of the test piece. The strain in the test piece is related to the torsion thereof by means of the rigidity thereof, and it is measured by measuring the deformation of the field lines.

Figure 4:
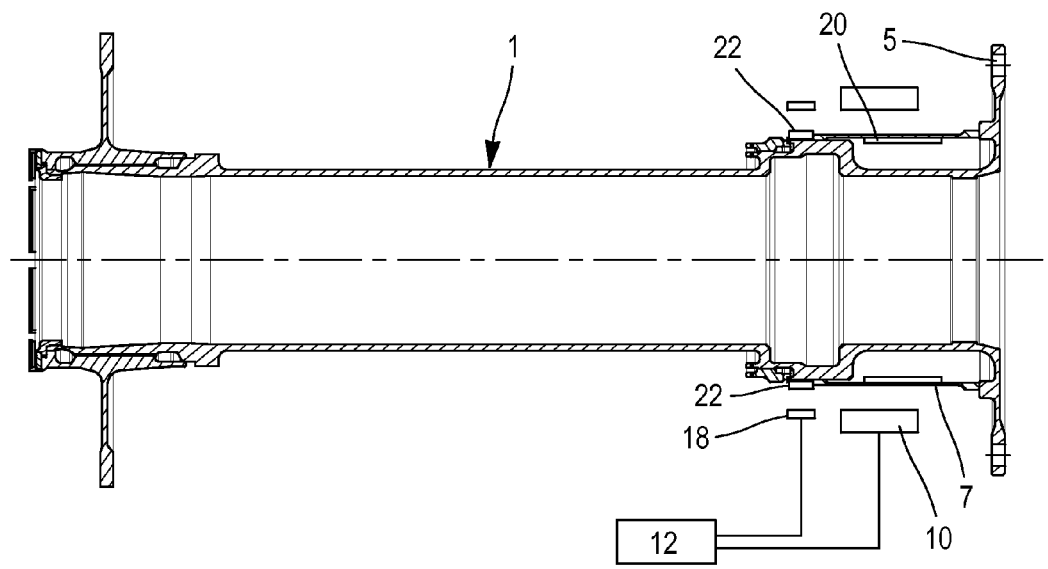
FIG. 4 is a schematic view of the measuring system from the invention.

The device is part of a measuring system which is shown schematically in FIG. 4, further comprising the magnetised test piece 7, one or more SAW gauges 20 which are mounted on the inner face of the test piece, and one or more antennas 22 which have an annular shape and are connected to the SAW gauges. A fixed antenna 18 is mounted on a stator part around the rotor, close to the rotating antennas. Sensors 10 which are used for magnetostrictive purposes are mounted around the rotor. The system comprises a unit 12 for processing the signals emitted by these fixed sensors and antennas.

Figure 3:
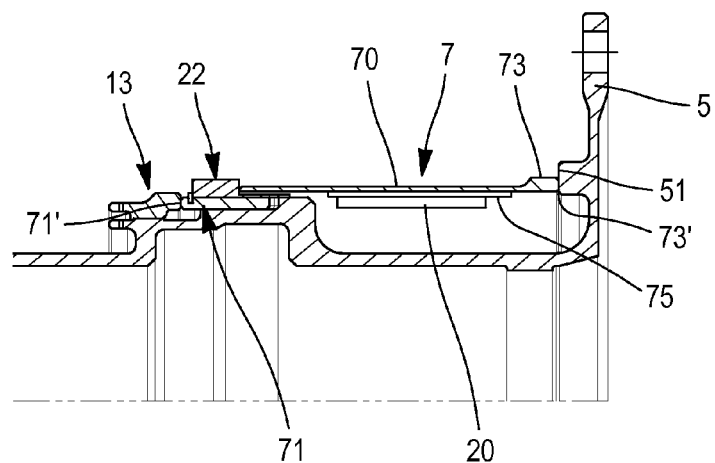
FIG. 3 is a cross-sectional view of the portion of the shaft from FIG. 2 with the measuring device.

The mounting is shown in greater detail in FIG. 3.

The magnetised test piece 7 is a cylindrical part which is composed of three axial parts having a magnetised main strut 70, a ring 71 having jaw teeth at a first axial end and a bearing ring 73 at the other end thereof; said bearing ring optionally has contact teeth.

On the inner face of the strut 70, it has flat spots 75 which make it possible to fix the SAW gauges 20.

The strut 70 of the test piece 7 is made of a ferromagnetic alloy, in particular a martensitic alloy, in order to be able to be magnetised and used for magnetostrictive purposes. By contrast with the solution presented in FR 1362037, which is cited above, it does not have slots in the circumference thereof. This is in order to preserve azimuthal uniformity of the magnetic field generated by the shaft, and to guarantee the uniformity of the stress field.

However, it should be noted that the antenna of the SAW gauges is positioned outside the test piece whilst being mounted on an edge of said test piece in such a way that it can communicate with the unit for processing the signals. The test piece forms a Faraday cage and would prevent the reception of information originating from the SAW gauges if the antenna were placed close to said gauges.

For this purpose, the magnetisation of the test piece and not the shaft itself has two advantages: firstly, the composition of the shaft is not restricted by the requirements of the magnetisation process, and secondly, the shaft does not have to be subjected to the magnetisation process, and this facilitates the industrial configuration of the manufacture thereof and of the mounting thereof on the engine.

The test piece 7 is a tube having a diameter which is greater than that of the shaft 1 on which it is mounted, the two being concentric. It is arranged, according to the embodiment shown in the present application, so as to be rigidly connected to the shaft by means of friction. For this purpose, it has two fixing elements formed by two annular surface portions which are perpendicular to the axis, which are upstream in the case of the surface 71' of the ring 71 comprising the jaw teeth and downstream in the case of the surface 73' on the ring 73 respectively, which surfaces are capable of coming into contact with corresponding surfaces on the shaft. A first contact surface 51 is formed by a track which is made on the flange 5, and the second contact surface is that of a nut 13, which is engaged on the shaft and onto which it is screwed.

The test piece 7 comprises recesses 75 for receiving the SAW gauges 20. Said recesses 75 are preferably provided on the inner face of the test piece 7 in such a way that the layer connecting the gauges, in particular a thin layer of adhesive, is only subjected to compressive forces during the operation of the machine and so as to avoid separation.

The device comprises an antenna 22 in the form of a metal filament which is adhered to or moulded into a non-conductive material of the ring 71. It is essential for the antenna to be electrically insulated with respect to the shaft. Said antenna is rigidly connected to the outer diameter of the shaft 1 in order to communicate by means of electromagnetic waves with the interrogation system of the gauges which are located on the stator part.

In practice, the antenna is installed on the test piece by means of a cylindrical shaft which is provided on the ring 71 of said test piece and held in place by means of a resilient ring for example. Said antenna is preferably blocked tangentially by means of a jaw tooth or the like. The gauges are located on the internal diameter of the magnetised strut 70 of the test piece. The antenna is thus equipped with axial connectors which coincide with axial slots which are made in the ring 71.

These connectors allow connection to the network of gauges which are located on the internal diameter of the test piece.

The device is mounted in a simple manner. It is sufficient to slide the device along the shaft until the contact surface 73 thereof bears against the bearing surface 51 of the flange 5. Said device is held in this position by a suitable tool. The nut 13 is then engaged on the shaft and is screwed in such a way that the test piece 7 is held firmly on the shaft by the axial strain imposed by the tightening nut. The tool can then be removed. Such a tool is not necessary when teeth and jaw teeth are arranged at the interface between the test piece and the shaft.

The axial strain creates a region of friction between the test piece and the flexible vertical flange on the shaft. The friction is strong enough to ensure that the test piece is held on the shaft during the torsion thereof. Analogously, on the side of the nut, the friction of the nut on the test piece rigidly connects said test piece to the shaft.

The friction forces produced by the tightening prevent the support from sliding in rotation.

The torque in the shaft translates into a variation in the magnetic permeability of the test piece which is received by 10.

In accordance with the invention, the device is calibrated in the following manner.

The measurement with SAW gauges is calibrated outside the engine, by applying reference static torques, under a known and controlled ambient temperature. The aim is to establish a law linking the variation of the resonance frequency of the strain gauges to the actual torque applied to the shaft and to the temperature. The electronics associated with the processing of the SAW gauges are of the 'industrial' type, which are used as instrumentation, and not electronics of the 'series motor' type which can be used in flight.

The assembly is then mounted on the engine, without putting said engine into operation. The calibration law established outside the engine is optionally corrected according to the temperature for measurement values corresponding to zero torque. There is thus a very precise calibration law linking the actual torque and the frequency response of the gauges on the engine.

The engine is then put into operation. A calibration law is established between the torque measured by means of the magnetostrictive measurement and reference torque given by the SAW measurement calibrated previously.

Here again, the industrial electronics are used to process the SAW gauges, and the regulation electronics are used to process the magnetostrictive measurement, which is simpler to process.

Thereafter, the system of SAW gauges no longer has to be used, only the magnetostrictive measurement remains active and useful for regulation. The processing electronics are disconnected, and the engine thus remains with the regulation electronics thereof and the calibrated magnetostrictive measurement thereof in real conditions.

The gauges remain on the engine. It should be noted that even in the event of deterioration of the gauges, said gauges are confined in the chamber created by the test piece.

The invention claimed is:

1. Device for measuring the torque transmitted by a turbine engine shaft, comprising:
    a test piece which can be mounted on the shaft, said test piece being capable of being magnetised and forming a support for at least one surface acoustic wave strain gauge,
    means for measuring the torque by means of a magnetostrictive effect, using magnetostrictive measuring sensors which are capable of capturing a variation in the magnetic permeability of the magnetised test piece, and
    means for calibrating the measurement of the torque by means of a magnetostrictive effect, which are capable of establishing a calibration law between the torque measured by said measuring means and a reference torque given by said at least one strain gauge.

2. Device according to claim 1, the test piece of which has a tubular shape, said at least one strain gauge being fixed to the interior wall of the tubular test piece and comprises an antenna for transmitting signal which is connected to said at least one strain gauge, said tubular test piece being arranged so as to be mounted concentrically with said shaft and having two elements for fixing to the shaft, which elements are axially remote from one another.

3. Device according to claim 2, of which at least one of the fixing elements is a friction fixing element.

4. Device according to claim 3, of which at least one friction fixing element comprises a contact surface which is perpendicular to the axis of the tubular test piece.

5. Device according to claim 2, of which at least one of the fixing elements comprises teeth which are arranged so as to cooperate with the teeth on the shaft which have a complementary shape.

6. Device according to claim 2, the antenna of which is cylindrical.

7. Turbine engine shaft, comprising a measuring device according to claim 1.

8. Shaft according to claim 7, comprising a radial flange, one end of the device being held on the shaft by bearing axially against the flange.

9. Device according to claim 1, wherein it comprises sensors which can be fixed on a stator part opposite the test piece for the magnetostrictive measurement, a fixed antenna which can receive the signals from said at least one strain gauge and a unit for processing the signal.

10. Method for calibrating a device for measuring the torque transmitted by a turbine engine shaft according to claim 1, comprising:
    a step of establishing a law between the strain measured by said at least one strain gauge and the actual torque applied outside the shaft,
    a step of mounting the device on the shaft, and
    a step of establishing a calibration law between the torque measured by means of a magnetostrictive effect and the reference torque given by said at least one strain gauge.

11. Shaft according to claim 8 wherein said radial flange comprises a jaw tooth connection at the other end thereof.

* * * * *